(12) United States Patent
Stefanko et al.

(10) Patent No.: US 11,153,405 B2
(45) Date of Patent: Oct. 19, 2021

(54) TRANSPARENT PATTERN PROCESSING IN A SERVICE MESH

(71) Applicant: Red Hat, Inc., Raleigh, NC (US)

(72) Inventors: Martin Stefanko, Brno (CZ); Ondrej Chaloupka, Brno (CZ)

(73) Assignee: Red Hat, Inc., Raliegh, NC (US)

( * ) Notice: Subject to any disclaimer, the term of this patent is extended or adjusted under 35 U.S.C. 154(b) by 380 days.

(21) Appl. No.: 16/377,572

(22) Filed: Apr. 8, 2019

(65) Prior Publication Data

US 2020/0322444 A1 Oct. 8, 2020

(51) Int. Cl.
*G06F 15/16* (2006.01)
*H04L 29/08* (2006.01)

(52) U.S. Cl.
CPC .......... *H04L 67/2833* (2013.01); *H04L 67/16* (2013.01); *H04L 67/26* (2013.01); *H04L 67/2804* (2013.01)

(58) Field of Classification Search
CPC ..... H04L 67/2833; H04L 67/16; H04L 67/26; H04L 67/2804
See application file for complete search history.

(56) References Cited

U.S. PATENT DOCUMENTS

| | | | |
|---|---|---|---|
| 2018/0077038 A1* | 3/2018 | Leff | H04L 43/0823 |
| 2018/0139307 A1* | 5/2018 | Gausman | G06Q 40/00 |
| 2019/0220331 A1* | 7/2019 | Duggal | G06F 9/5072 |
| 2019/0273746 A1* | 9/2019 | Coffing | H04L 63/105 |
| 2019/0356693 A1* | 11/2019 | Cahana | H04L 41/12 |
| 2020/0042406 A1* | 2/2020 | Natanzon | G06F 8/65 |
| 2020/0112487 A1* | 4/2020 | Inamdar | H04L 41/082 |
| 2020/0162380 A1* | 5/2020 | Pilkington | H04L 45/70 |
| 2021/0084109 A1* | 3/2021 | Gimenez Palop | H04L 63/0428 |

FOREIGN PATENT DOCUMENTS

CN 108287929 A 7/2018

OTHER PUBLICATIONS

Indrasiri, K., "Service Mesh for Microservices," Director—Integration Architecture@WSO2, Sep. 14, 2017, https://medium.com/microservices-in-practice/service-mesh-for-microservices-2953109a3c9a.

(Continued)

*Primary Examiner* — Oleg Survillo
(74) *Attorney, Agent, or Firm* — Kilpatrick Townsend & Stockton LLP (57) ABSTRACT

A processing device can execute a proxy to provide transparent pattern processing for services that are not pattern-aware. A saga is one example of a processing pattern. The proxy deals with the pattern coordinator that maintains the pattern. The proxy manages the interaction between the service and the pattern coordinator so that services that are not pattern-aware can participate in the pattern. The processing device in a system can generate a unique pattern identifier at the first proxy and send the unique pattern identifier from the first proxy to the pattern coordinator to enlist the first service in a processing pattern. Other services can be similarly enlisted. The unique pattern identifier forms part of the pattern context and is used in messaging between the proxies and the pattern coordinator on behalf of the non-pattern-aware services.

20 Claims, 6 Drawing Sheets

(56) References Cited

OTHER PUBLICATIONS

Jory, Zach, "Comparing Service Mesh Architectures," DZone—Microservices Zone, Mar. 27, 2018, https://dzone.com/articles/comparing-service-mesh-architectures.
Posta, Christian, "Application Safety and Correctness Cannot Be Offloaded to Istio or Any Service Mesh," Chief Architect, cloud application development@Red Hat, 2018, hhtp://blog.christianposta.com/microservices/application-safety-and-correctness-cannot-be-offloaded-to-istio-or-any-service-mesh/.
Riady, Yos, "Distributed Sagas for Microservices," DZone—Microservices Zone, Feb. 22, 2018, https://dzone.com/articles/distributed-sagas-for-microservices.
Taylor, Twain, "An Overview of the Service Mesh and Its Tooling Options," Jun. 1, 2018, https://blog.codeship.com/an-overview-of-the-service-mesh-and-its-tooling-options/.

* cited by examiner

TRANSPARENT PATTERN PROCESSING IN A SERVICE MESH

TECHNICAL FIELD

The present disclosure relates generally to managing long-living transaction processing occurrences in a service mesh running on a distributed network. More specifically, but not by way of limitation, this disclosure relates to saga processing during runtime without the need to restart or redeploy microservices that are involved in the processing.

BACKGROUND

Saga is a processing mechanism used in cloud networks. For example, saga can be used with a cloud computing system such as one based on Kubernetes or OpenShift, which includes clusters to which various applications are deployed. A saga is a stored pattern for breaking down long-living operations into multiple steps or activities that can be tracked and managed. Such activities, because they can take place over extended processing periods, sometimes days, might otherwise suffer failures due to changes in the states of various systems and services. A saga invocation is typically implemented as a library that is part of a service in a running application. The saga is configured with all the appropriate, saga-aware services prior to deploying and running the application. When the saga is changed, the application that includes the saga-aware services is redeployed.

DETAILED DESCRIPTION

Saga is an example of a type of transaction processing pattern used in cloud networks, such as one based on Kubernetes or OpenShift. In such a framework, requests make use of services. A "service" includes a microservice, such as those independently deployable services organized in a microservice architecture. A service mesh is an optimization of how the microservice architecture is deployed and managed. Saga can be used to break down long-living, computer-implemented processes, sometimes called long-living transactions, into multiple steps or activities that can be tracked and managed. The processing pattern can be configured with all the appropriate, pattern-aware services prior to deploying and running the application. When the pattern needs to be changed, the application that includes the pattern-aware services needs to be redeployed because many of the settings are included in the services themselves. This redeployment causes delay and may result in the application being unavailable. Also, with a processing pattern, the framework normally relies on services that have built-in knowledge of the how patterns work. In the case of saga, the saga invocation relies on services that are saga-aware, limiting the flexibility to use any service with the saga.

Some examples of the present disclosure overcome one or more of the issues mentioned above by providing a proxy for a non-pattern-aware service so that the non-pattern-aware service may be used in a processing pattern. More varied services are available for use, improving flexibility. Additionally, changes can be made to settings for the pattern without taking applications offline. Since the applications can continue to operate while changes are made, delays in processing can be avoided.

In some examples, the pattern is a saga and the non-pattern-aware service is a non-saga-aware service. The proxy serves as a software sidecar to a service. The proxy deals with a pattern coordinator that maintains the pattern. The proxy manages the interaction between the service and the pattern coordinator so that services without built-in knowledge of how a type of pattern works can participate in the pattern. In the case of saga, the saga invocation can work with services that are not saga-aware. Since the pattern functionality for a service is in the proxy instead of in the service itself, changes to the pattern can be made without redeploying the application that implements the service. The attributes of the pattern, for example, saga, can thus be configured on-demand, in real time. The pattern processing by the proxy is transparent to the service and the pattern coordinator and is thus referred to herein at times as transparent pattern processing.

As an example, a processing device can generate, in response to a client request, a unique pattern identifier at a first proxy associated with a first service within a service mesh. The processing device can transmit the unique pattern identifier from the first proxy to a pattern coordinator to enlist the first service in a pattern corresponding to the unique pattern identifier. The unique pattern identifier can also be transmitted to at least one additional proxy to enlist at least one additional service in the pattern. The processing device can also transmit an end notification with the unique pattern identifier from the first proxy to the pattern coordinator in response to detecting at least one response indicating processing by the at least one additional service has ended.

In some examples, the end notification can include a completion notification message or a compensation-only message. The completion notification message indicates the service has successfully completed its task and processing has ended. The compensation-only message indicates an error at the service has been detected. In such a case, the compensation-only notification is transmitted to the pattern coordinator so that the pattern coordinator declines any new enlistments for the pattern.

In some examples, the pattern identifier includes a time stamp indicating when the pattern identifier was created. In some examples, the pattern identifier includes a service identifier corresponding to a service. In some examples, the processing device can receive a compensate message from the pattern coordinator to cause a data store associated with a service to be updated, for example, to revert changes previously made in the case of an error.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

A service mesh is an infrastructural layer which manages service-to-service communication in a cloud network such as one based on Kubernetes or OpenShift. The service mesh can be a separate infrastructure layer on top of an orchestration platform.

The service mesh includes a component that can be referred to as a control plane, which defines how the mesh functions. The control plane instructs agents. The control plane can be deployed next to the user microservices.

As described above, a proxy agent (also referred to as a "proxy" or a "sidecar") according to some aspects of this disclosure processes all the incoming and outgoing communication for a service and relays it to the service, including communication to and from a pattern coordinator. The proxy can route the traffic based on any information included in the incoming or outgoing message. Pattern processing can then take place in the proxy. Thus, a service that is not pattern-aware can be used with pattern as long as a proxy is deployed as a sidecar to that service. The proxy is able to ensure that the pattern is started; the proxy can read parameters of the pattern processing; the proxy can be capable of receiving pattern instructions and performing pattern actions based on the existence of the pattern context in the incoming message without the need to interfere with the actions being carried out for a client.

Figure 1:
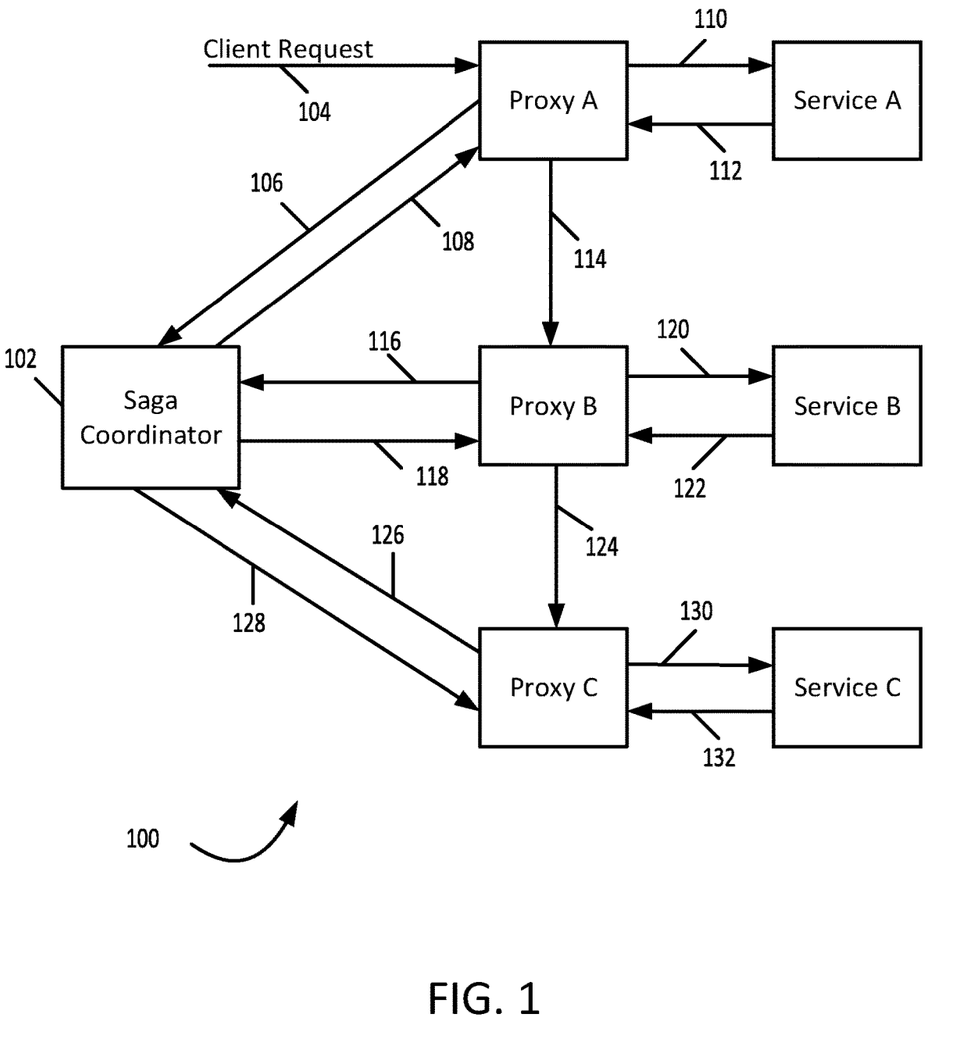
FIG. 1 and FIG. 2 are messaging diagrams depicting example processing flows according to some aspects of the disclosure.
Figure 2:
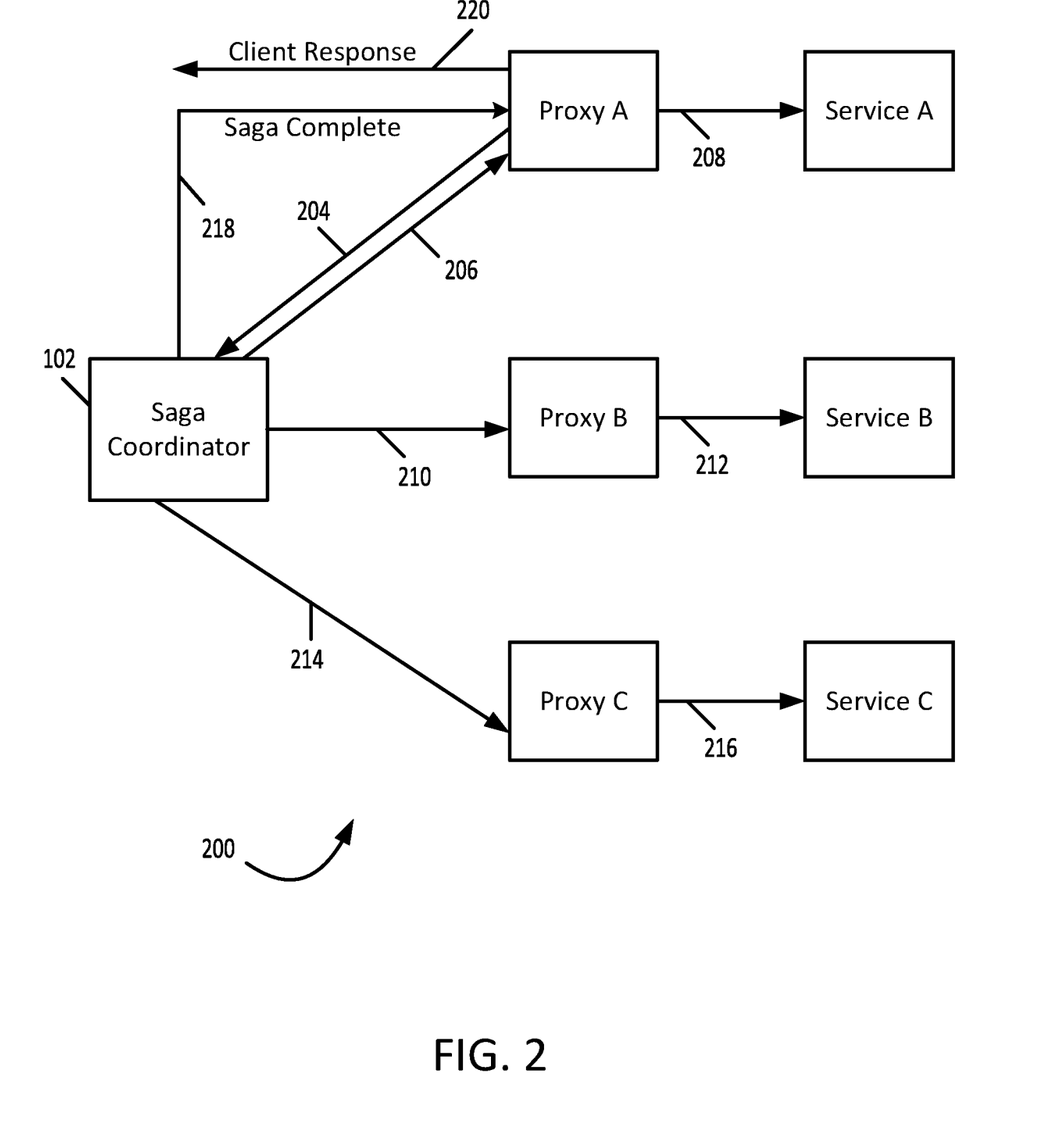

The examples described with respect to FIG. 1 and FIG. 2 presented herein are based on saga processing. However, features and aspects of this disclosure can be used with other types of pattern processing in distributed computing networks.

FIG. 1 is a messaging diagram that illustrates processing flow 100 according to some aspects of the disclosure. For illustrative purposes, service A, service B, and service C are part of the saga invocation managed by saga coordinator 102.

Client request 104 is received at proxy A. Proxy A generates the unique saga identifier and sends it to the saga coordinator with message 106 to enlist service A in the saga. Saga coordinator 102 responds with message 108. Proxy A sends the client request to service A using message 110 and the service responds with invocation message 112.

Still referring to FIG. 1, proxy A then sends a service invocation request 114 to proxy B, which is associated with service B and is the next service required in the saga invocation. This request includes the unique saga identifier. Proxy B sends the unique saga identifier to the saga coordinator with message 116 to enlist service B in the saga invocation and the saga coordinator sends response 118. Proxy B sends the client request message 120 to service B and service B responds with invocation message 122.

Continuing with FIG. 1, proxy B then sends a service invocation request 124 to proxy C, the proxy for service C, the next service required in the saga invocation. This request includes the unique saga identifier. Proxy C sends the unique saga identifier to the saga coordinator with message 126 to enlist service C in the saga invocation and the saga coordinator sends response 128. Proxy C sends the client request message 130 to service C and service C responds with invocation message 132.

Once the enlisted services in the example above perform their tasks, each one returns a completion notification back to its proxy indicating the service has completed its job. The completion notifications with the unique saga identifier are then propagated by the proxies back to proxy A, which then determines that the saga is complete.

FIG. 2 is a messaging diagram illustrating processing flow 200, which includes a completion notification message 204 being sent from proxy A to saga coordinator 102. The completion notification message 204 indicates that a portion of an application executed by service A has been completed. In such a case, the service A reacts with a completion. If the saga coordinator 102 determines that the entire saga has been completed based on the completion notification 204, then the saga coordinator 102 responds to proxy A with message 206 that notifies proxy A of the saga completion. This can cause service A to compensate for the state of the saga invocation. Proxy A propagates a compensate message 208 to service A so that database tables for service A are updated. If message 204 being sent from proxy A to saga coordinator 102 indicates a saga failure then service A would react with a compensatory action and this message would be considered a compensation message.

Likewise, saga coordinator 102 sends message 210 to notify proxy B of the saga completion and to compensate for the state of the saga invocation. Proxy B propagates a compensate message 212 to service B so that database tables for service B are updated.

Similarly, saga coordinator 102 sends message 214 to notify proxy C of the saga failure so that compensation for the state of the saga invocation can take place. Proxy C propagates a compensate message 216 to service C so that database tables for service C are updated. The saga coordinator 102 than sends a saga complete message 218 to proxy A. In turn, proxy A sends client response 220. Message 214 could instead notify proxy C of completion if appropriate.

As a particular example of the above, if the application is connected with booking a trip, service A might be a flight booking engine, service B might be a hotel booking engine, and service C might be a ride-booking service. In this example, the client request 104 would be for booking a trip. All the services should align and communicate so that, as an example, if the hotel booking service for the particular date requested cannot find a room, the time of the flight can be changed by the flight booking engine. If the application is a trip booking application, it is contacted by a client for booking travel to a desired location. The trip booking application calls several services where each independently manages booking of the particular part of the trip or maintains the data required by the system. There are at least three services that are invoked: a service booking the flight, a service booking the hotel, and the service booking the ride. In this example there may be a fourth service, one to manage collected statistics. For purposes of this example, assume this last service is not saga-aware and is not assigned a proxy. It is possible to mix services that are saga-aware, services that use a deployed proxy sidecar, and services that are not saga-aware and don't use the proxy sidecar in the same application. The proxies in this example read the context of incoming and outgoing requests. The context is the data packed alongside to a message, which contains at least the unique saga identifier that differentiates this saga from other sagas running at the same time in the service mesh.

In the above example, the control plane defines which applications are saga-aware, and which application is permitted to start new saga. The travel-booking application is saga-aware as it is expected to be contacted by the client and thus it is obliged to start a saga in response to a client request. A scenario like that illustrated in FIG. 1 and FIG. 2 starts with the client request to book the trip. The first proxy checks the context included in the request. The saga identifier includes a randomly generated part and a suffix containing the name of the service the proxy belongs to extended by the timestamp corresponding to the identifier's creation. This format creates a unique identifier that allows for the detection of a start time and the originator of the saga. In some aspects, a script can be included as a filter, for example, an embedded LUA script. The proxy for the flight service, proxy A above, contacts the saga coordinator to enlist itself in the saga, via asynchronous call to the saga coordinator or by sending a message to an event store. The unique saga identifier is attached to the request context and handed over to the service.

The responsibility of a service that is not at the end of the call chain is to re-send the incoming saga identifier context with any call or message that leaves the service. The same service capability can be used for tracing if a record of the span is to be preserved. A compensation handler within a proxy propagates compensation messages. The compensation request can provide all necessary information about the original client request as necessary to update database tables tracking its status. The application does not need to depend on any specific saga library. The service mesh environment manages the saga. The system ensures that any outgoing message contains the unique saga identifier. All the booking services from this example are defined to the saga coordinator to be saga aware. The fact that a proxy is handling saga-related tasks for a service is transparent to the other entities in the system. When a service such as the flight-booking service (A), the hotel-booking service (B), or the ride-booking service (C) that is actually not saga-aware but has a proxy is called from the application, its proxy verifies the existence of the saga in the context and enlists the service under the unique saga identifier by contacting the saga coordinator. The statistics service is marked in the control plane as not being saga aware and the statistics service will not process an enlistment.

When one of the services in this example responds, the response needs to use globally agreed statuses so the corresponding proxy understands if the relevant action succeeded. When a proxy detects an error response it marks the saga as compensation-only. The saga coordinator then declines any new requests for service enlistment in the saga. When the services have all succeeded in carrying out the required tasks, responses from all services are collected, and the trip-booking application can confirm that processing was performed successfully to the client with a client response such as client response 220. The outgoing call is observed by the first proxy, which can detect, based on the unique saga identifier, that it was the initiator of the saga. The proxy contacts the saga coordinator to complete the saga via message 204. If the response to the client is to indicate an error then the proxy request compensation-only mode. Based on the type of request, the saga coordinator invokes complete or compensate callbacks at each service participating in the saga. This invocation includes the unique saga identifier for the participant to match the original request with the invocation of completion or compensation.

The protocol can be enhanced in some aspects such that participant enlistment contains data that is stored by the saga coordinator and then passed back along the completion or compensation invocation path. The booking application can change the final message that is being sent to the client based on the completion or compensation result. The message contents can be set based on the specific error from the saga coordinator (e.g. there was a compensation-only flag set for the saga). In the above examples, the service mesh can provide capabilities of tracing, authentication or auto-retries, which can benefit any client of the saga system described above.

Figure 3:
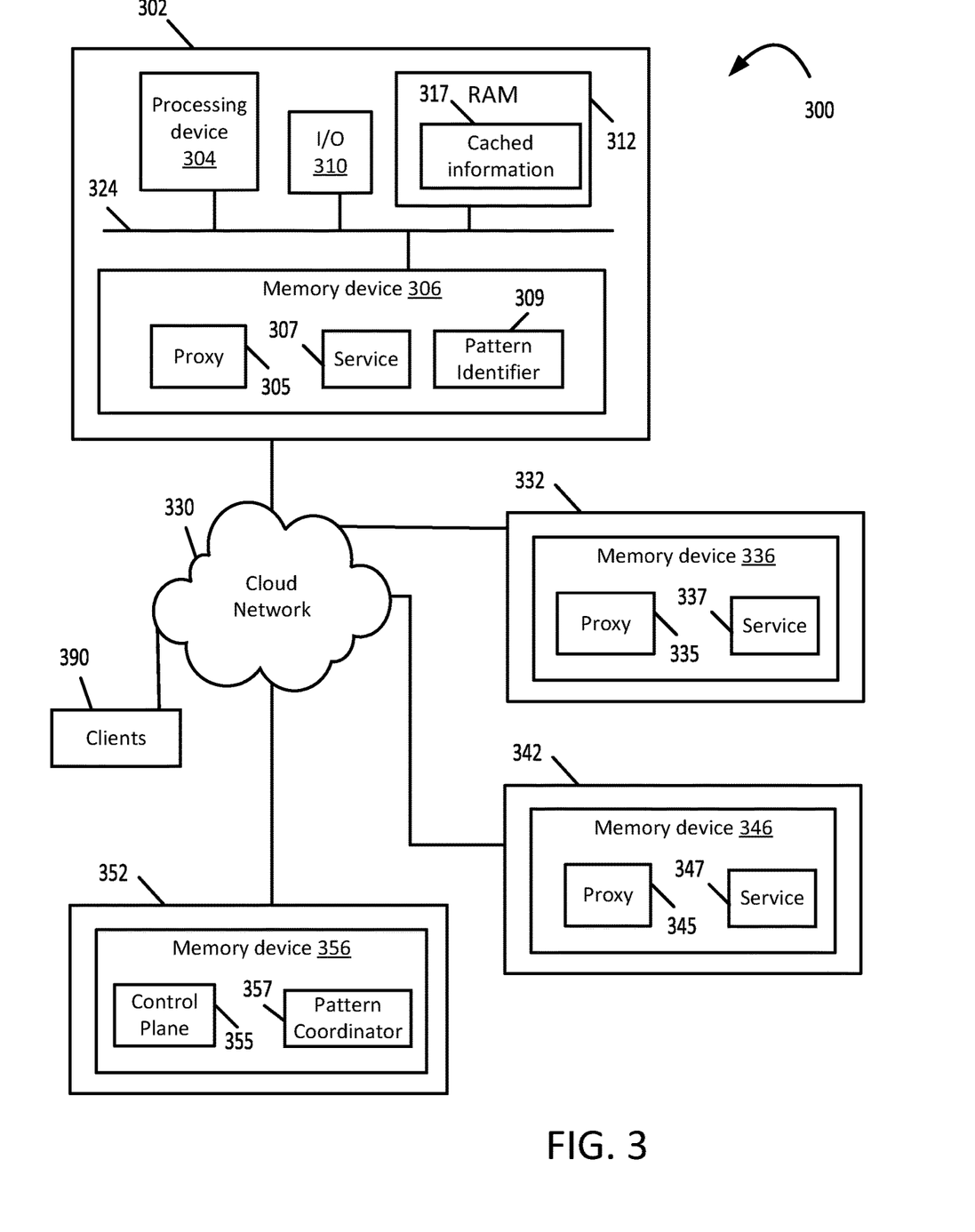
FIG. 3 is a block diagram of an example of a system that provides transparent pattern processing according to some aspects of the disclosure.

FIG. 3 is a system 300 that provides transparent pattern processing according to some aspects of the disclosure. More specifically, the system 300 includes a computing device 302. Examples of the computing device 302 can include a server, laptop computer, desktop computer, or any combination of these. The computing device 302 can execute software as defined below, which causes computing device 302 to perform the tasks of transparent pattern processing according to some aspects of the disclosure. Software can include computer-readable instructions that are executable by a processing device 304, such as proxy 305, which includes the computer-readable instructions to perform the transparent pattern processing for service 307. The proxy can be programmed in any suitable programming language, such as Java, C++, C, Python, or any combination of these. Note that the software that implements transparent pattern processing as described in an exemplary fashion herein is distinct from the software that makes up applications and services running in the cloud network.

In FIG. 3, computing device 302 includes the processing device 304, memory device 306, an input/output (I/O) module or modules 310, and a random-access memory (RAM) 312. A bus or interconnect 324 is also provided to allow for inter- and intra-device communications using, for example, I/O module 310. I/O module 310 can include a network interface (not shown), which in turn communicates with cloud network 330. Cloud network 330 connects computing device 302 to computing devices 332, 342, and 352. Each computing device can include a processing device, I/O, and other components similar to computing device 302 and other typical computing devices, but these details are omitted in FIG. 3 for clarity. In the example of FIG. 3, other services and their proxies are shown running in computing devices 332 and 342. However, multiple services and proxies can be run on the same computing device. In the example of FIG. 3, computing device 332 includes memory device 336 and is running proxy 335 and service 337. Computing device 342 includes memory device 346 and is running proxy 345 and service 347.

Still referring to FIG. 3, computing device 352 includes memory device 356 and is running a control plane 355 and a pattern coordinator 357. The pattern coordinator keeps track of the pattern by monitoring messaging and tracking the status of services in the pattern. In the example of FIG. 3, pattern coordinator 357 actually monitors the proxies, but the fact that it is monitoring proxies instead of monitoring the services themselves is transparent to the pattern coordinator. A control plane distributes operating rules so that all services that are part of a pattern operate with parameters that are compatible with the particular pattern. Control plane 355 of system 300 distributes these operating rules to all the proxies, proxy 305, proxy 335, and proxy 345. The control plane 355 and the pattern coordinator 357 are implemented as microservices in the service mesh of system 300.

In the example of FIG. 3, the cached information 317 includes service invocation requests and client requests connected with the use of the application services in the pattern. Other information used by system 300 may be stored in RAM 312. The same service invocation requests and client requests can also be stored in memory device 306 for longer periods. In addition to proxy 305 and service 307, which are computer-readable program code instructions executed by processing device 304 to service clients 390 using a processing pattern, memory device 306 can include a unique pattern identifier 309 for the pattern currently being used. In the example of saga processing, the unique pattern identifier might be called the unique saga identifier. This unique pattern identifier forms a portion of the messaging between the pattern coordinator and the proxies. The pattern identifier is unique in the sense that it differentiates the pattern instance from all other pattern instances running in a given service mesh at the same time.

Figure 4:
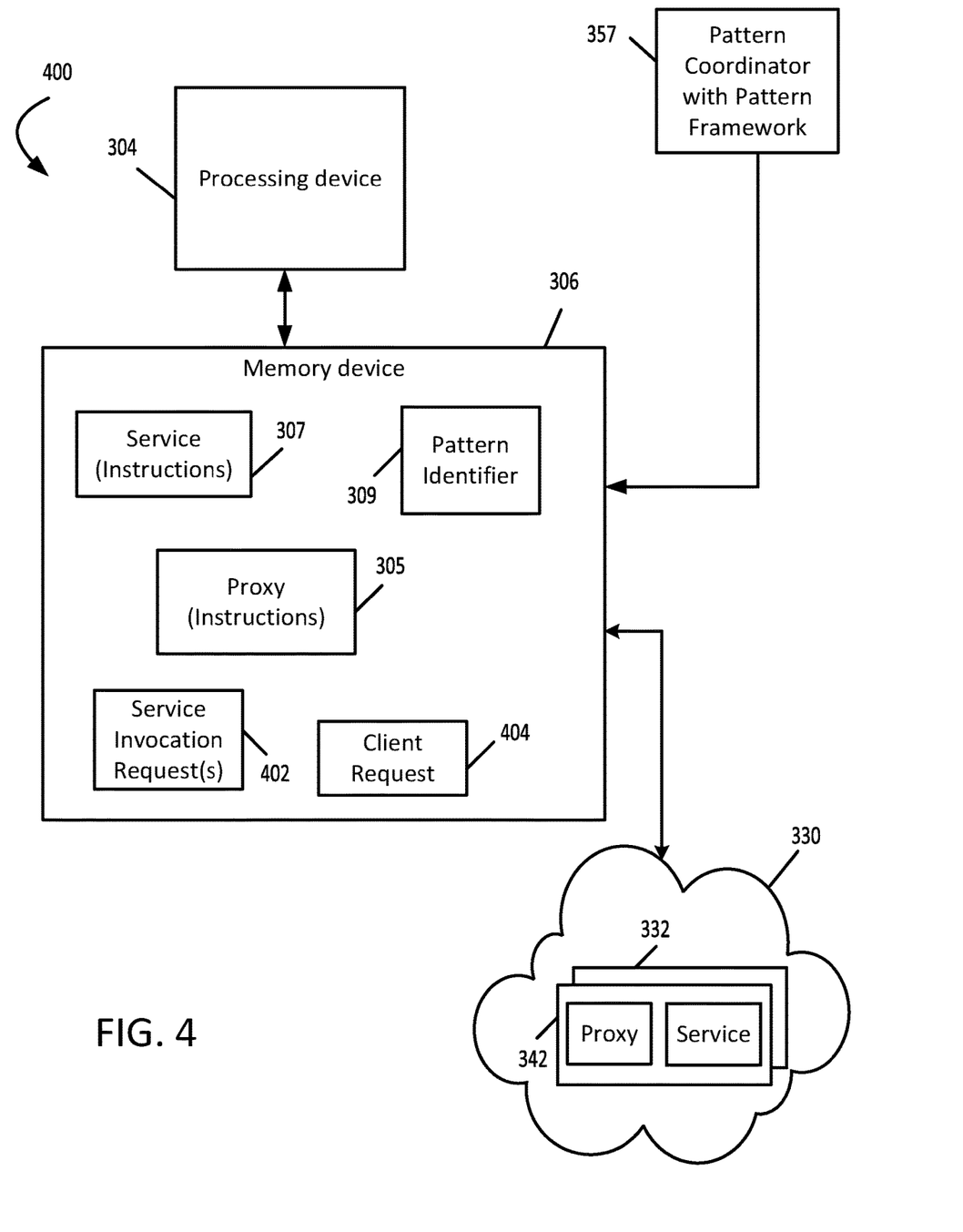
FIG. 4 is a block diagram of another example of a system that provides transparent pattern processing according to some aspects of the disclosure.

FIG. 4 is a block diagram of an example of a system for transparent pattern processing according to some aspects of the disclosure. The system 400 includes the processing device 304 that can execute computer program code, also referred to as instructions, program code, or program code instructions for proxy 305, for performing operations of the proxy as described herein. Processing device 304 is communicatively coupled to the memory device 306. The processing device 304 can include one processing device or multiple processing devices. Non-limiting examples of the processing device 304 include a field-programmable gate array (FPGA), an application-specific integrated circuit (ASIC), a microprocessor, etc. The processing device 304 can execute one or more operations for receiving a client request directed to an application and managing the communication with the pattern coordinator 357 and in accordance with the pattern set up for handling the client request.

Still referring to FIG. 4, memory device 306 can include one memory device or multiple memory devices. The memory device 306 can be non-volatile and may include any type of memory device that retains stored information when powered off. In some examples, at least some of the memory device can include a non-transitory computer-readable medium from which the processing device 304 can read instructions 307. A computer-readable medium can include electronic, optical, magnetic, or other storage devices capable of providing the processing device with computer-readable instructions for proxy 305 or other program code. Non-limiting examples of the memory device 306 include electrically erasable and programmable read-only memory (EEPROM), flash memory, or any other type of non-volatile memory. Non-limiting examples of a computer-readable medium include magnetic disk(s), memory chip(s), ROM, random-access memory (RAM), an ASIC, a configured processor, optical storage, or any other medium from which a computer processor can read instructions.

The memory device 306 can include computer program code for the proxy 305, a stored pattern identifier 309, and computer program code for the service 307 that corresponds to the proxy 305. The memory device 306 can also include stored service invocation requests 402 and stored client requests 404. A client request is a request from a client to make some use of an application and a service invocation request is a request passed between services but propagated by the proxies. The system of the example of FIG. 4 includes computing devices 332 and 342 that are running other proxies and services as shown in FIG. 3. Although FIGS. 3 and 4 depict a certain arrangement of components for illustrative purposes, other examples can include any number and combination of these components arranged in any suitable configuration.

Figure 5:
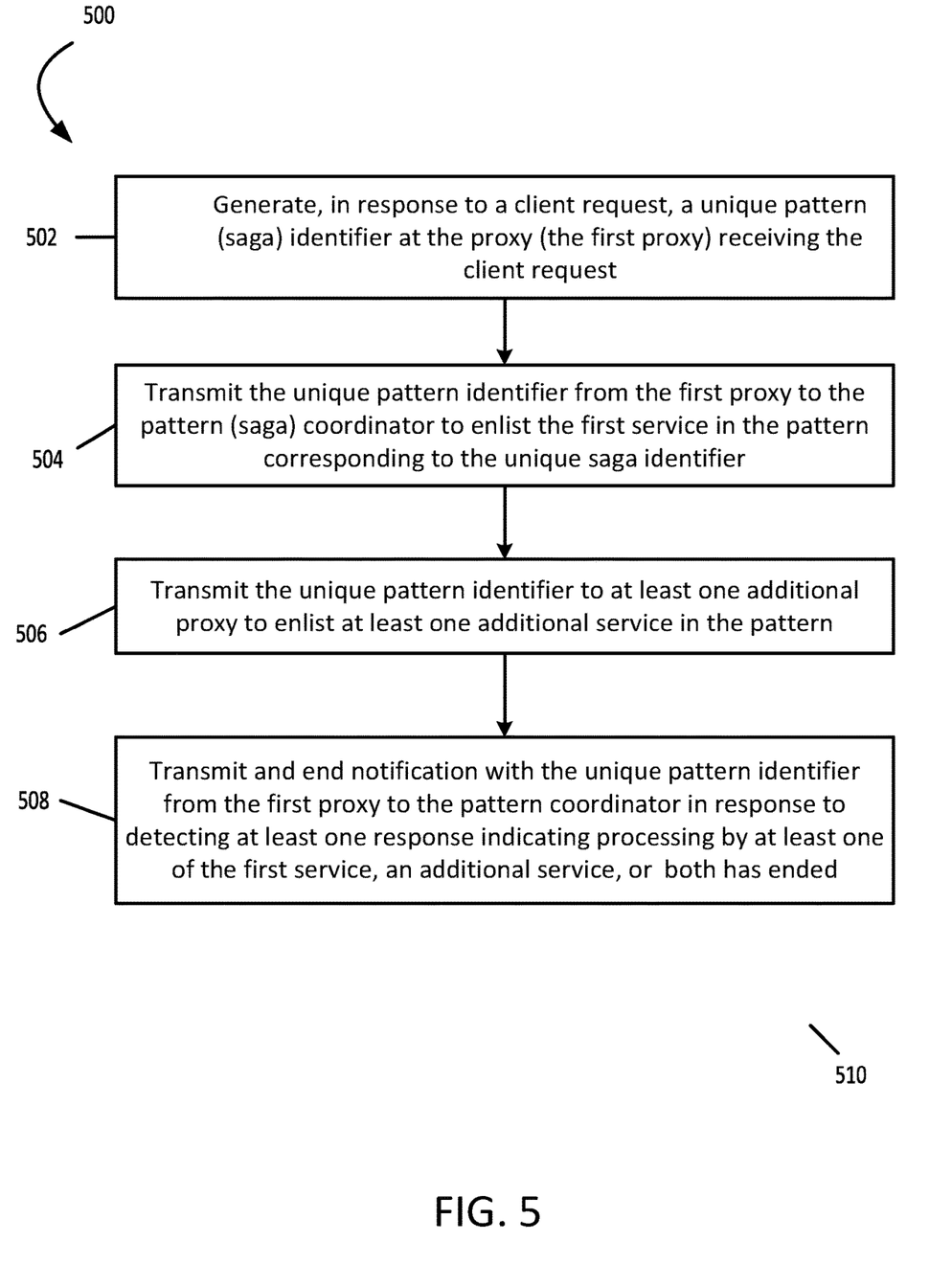
FIG. 5 is a flowchart of an example of a process for providing transparent pattern processing according to some aspects of the disclosure.

In some examples, a processing device (e.g., processing device 304) can perform one or more of the operations shown in FIG. 5 to provide transparent pattern processing according to some aspects of the disclosure. In other examples, the computing device can implement more operations, fewer operations, different operations, or a different order of the operations depicted in FIG. 5. Process 500 of FIG. 5 is described below with reference to components discussed above.

At block 502, processing device 304 generates a unique pattern identifier 309 in response to a client request. This unique pattern identifier 309 is generated at a first proxy that initially received the client request.

At block 504, the processing device 304 sends the unique pattern identifier from the first proxy to a pattern coordinator 357 to enlist a first service in a processing pattern corresponding to the unique pattern identifier 309. The message can be sent, as an example, using I/O module 310.

At block 506, the unique pattern identifier is transmitted to at least one additional proxy to enlist at least one additional service in the pattern. In some examples, the unique pattern identifier generated at the first proxy in block 502 is propagated to all other proxies either directly or through intervening proxies. Each proxy then optionally sends the unique pattern identifier together with some generated pattern identification of the proxy to (a set of endpoints) to the coordinator to enlist itself and its service in the pattern. On every outgoing call the proxy adds the unique pattern identifier to the call so that the next service (and its set of endpoints) can optionally also be enlisted with the pattern.

At block 508, an end notification with the unique pattern identifier is transmitted from the first proxy to the pattern coordinator in response to detecting at least one response from a service indicating processing by the first service, an additional service, or both has ended. The end notification can indicate successful completion or that compensation for an error is necessary.

Figure 6:
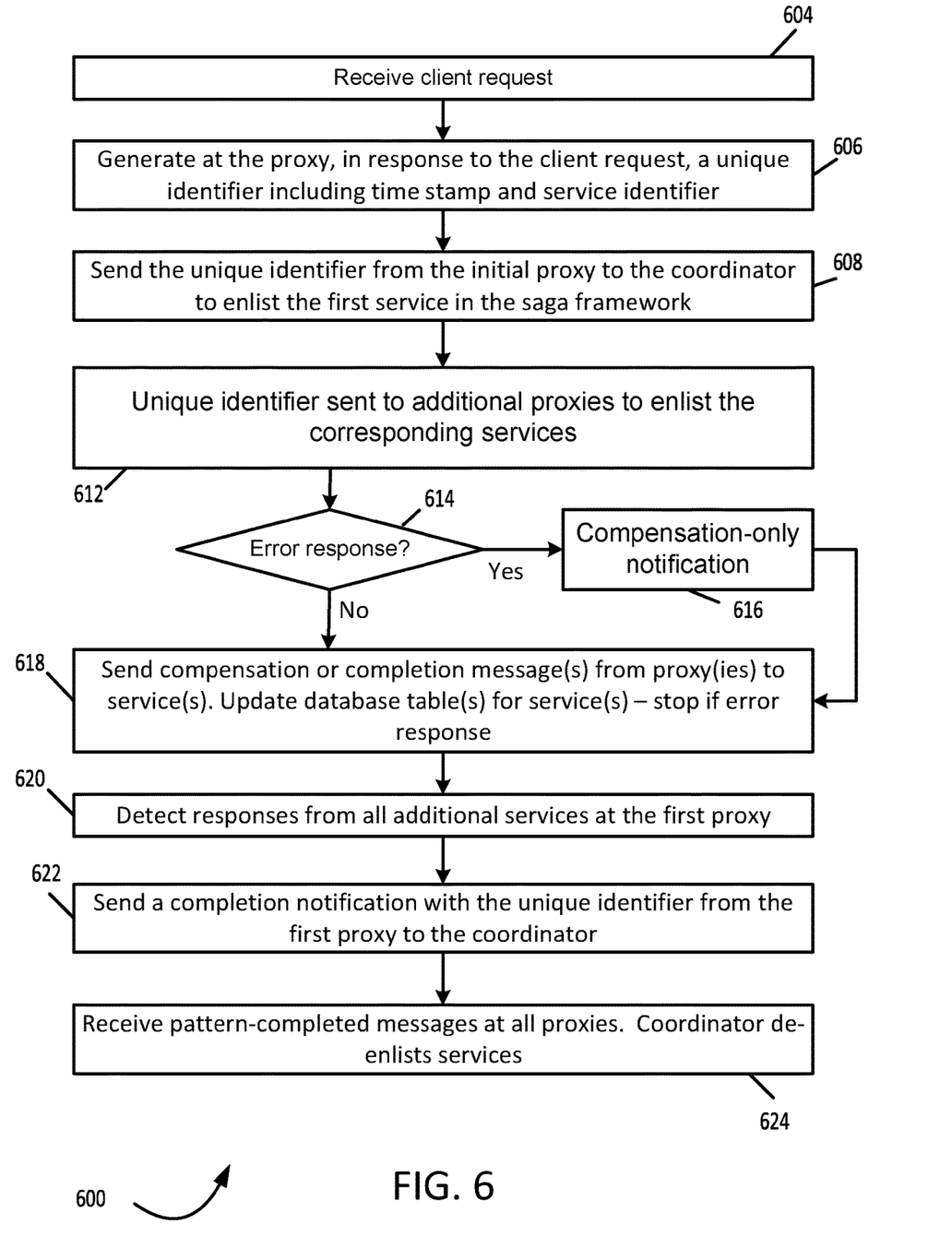
FIG. 6 is a flowchart of another example of a process for providing transparent pattern processing according to some aspects of the disclosure.

Other examples of the present disclosure can involve a computing device such as processing device 304 performing the operations of process 600 of FIG. 6. The computing device can alternatively implement more operations, fewer operations, different operations, or a different order of the operations depicted in FIG. 6. Process 600 of FIG. 6 is described below with reference to components discussed above.

At block 604 a client request is received from a client 390. At block 606, the processing device 304 executing a first proxy generates, in response to the client request, a unique pattern identifier 309. In this example, the pattern identifier includes a time stamp and an identifier for the first service to be enlisted in the pattern that corresponds to the identifier.

At block 608, the unique pattern identifier 309 is sent from the first proxy to the pattern coordinator 357 to enlist a first service 307 in the pattern. This message may be sent using I/O module 310. At block 612, the unique pattern identifier is sent to the additional proxies such as proxies 335 and 345 to enlist the corresponding services such as services 337 and 347.

Still referring to FIG. 6, if an error response is received by one of the proxies from one of the services at block 614, the proxy notifies the pattern coordinator to put the pattern in compensation-only mode at block 616. In compensation-only mode, an error is typically returned to the client and the application does not continue to execute to respond to the client request. Compensation messages are sent from proxies to services, as discussed immediately below. At block 618, the initial proxy and any additional proxies send end notifications (compensation or completion message(s)) to services. Compensation messages update data stores for all the services for those proxies so that the state of the application matches the state recorded in the pattern to account for the error that occurred. In the case of an error, processing may end here. The data store can take the form of a database table, but can be any data structure saved in storage.

Continuing with FIG. 6, at block 620, responses from all additional proxies for all additional services are detected at the first proxy. At block 622 a completion notification with the unique pattern identifier is sent from the first proxy, for example, proxy 305, to the pattern coordinator 357. At block 624, pattern completed messages are received at all proxies. The coordinator can de-enlist the services.

Unless specifically stated otherwise, it is appreciated that throughout this specification that terms such as "operations," "processing," "computing," and "determining" or the like refer to actions or processes of a computing device, such as one or more computers or a similar electronic computing device or devices, that manipulate or transform data represented as physical electronic or magnetic quantities within memories, or other information storage devices, transmission devices, or display devices of the computing platform. The order of the blocks presented in the examples above can be varied—for example, blocks can be re-ordered, combined, or broken into sub-blocks. Certain blocks or processes can be performed in parallel. Terms such as "less" or "more," when referring to numerical comparisons can encompass the concept of equality.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method comprising:
generating, by a processor, in response to a client request, a unique pattern identifier at a first proxy associated with a first service within a service mesh;
transmitting, by the processor, the unique pattern identifier from the first proxy to a pattern coordinator to enlist the first service in a pattern corresponding to the unique pattern identifier;
transmitting, by the processor, the unique pattern identifier to at least one additional proxy to enlist at least one additional service in the pattern; and
transmitting, by the processor, an end notification with the unique pattern identifier from the first proxy to the pattern coordinator in response to detecting that processing by the at least one additional service has ended.

2. The method of claim 1 wherein the end notification comprises a completion-notification message.

3. The method of claim 1 wherein the end notification comprises a compensation-only notification and the method further comprises:
detecting an error at at least one of the first service or the at least one additional service; and
transmitting, the compensation-only notification to the pattern coordinator so that the pattern coordinator declines any new enlistments for the pattern.

4. The method of claim 1 wherein the unique pattern identifier includes a time stamp indicating when the unique pattern identifier was created.

5. The method of claim 4 wherein the unique pattern identifier includes a service identifier corresponding to the first service.

6. The method of claim 1 further comprising receiving a compensate message from the pattern coordinator to cause a data store associated with at least one of the first service or the at least one additional service to be updated in accordance with a current state of the pattern.

7. The method of claim 1 further comprising receiving operating rules from a control plane.

8. A system comprising:
a processing device; and
a memory device including instructions that are executable by the processing device for causing the processing device to perform operations comprising:
generating, in response to a client request, a unique pattern identifier at a first proxy associated with a first service within a service mesh;
transmitting the unique pattern identifier from the first proxy to a pattern coordinator to enlist the first service in a pattern corresponding to the unique pattern identifier;
transmitting the unique pattern identifier to at least one additional proxy to enlist at least one additional service in the pattern; and
transmitting an end notification with the unique pattern identifier from the first proxy to the pattern coordinator in response to detecting that processing by the at least one additional service has ended.

9. The system of claim 8 wherein the end notification comprises a completion-notification message.

10. The system of claim 8 wherein the end notification comprises a compensation-only notification and the operations further comprise:
detecting an error at at least one of the first service or the at least one additional service; and
transmitting, the compensation-only notification to the pattern coordinator so that the pattern coordinator declines any new enlistments for the pattern.

11. The system of claim 8 wherein the unique pattern identifier includes a time stamp indicating when the unique pattern identifier was created.

12. The system of claim 11 wherein the unique pattern identifier includes a service identifier corresponding to the first service.

13. The system of claim 8 wherein the operations further comprise receiving a compensate message from the pattern coordinator to cause a data store associated with at least one of the first service or the at least one additional service to be updated in accordance with a current state of the pattern.

14. The system of claim 8 further comprising a control plane to distribute operating rules to the first proxy and the at least one additional proxy.

15. A non-transitory computer-readable medium comprising program code that is executable by a processing device for causing the processing device to:
generate, in response to a client request, a unique pattern identifier at a first proxy associated with a first service within a service mesh;
transmit the unique pattern identifier from the first proxy to a pattern coordinator to enlist the first service in a pattern corresponding to the unique pattern identifier;
transmit the unique pattern identifier to at least one additional proxy to enlist at least one additional service in the pattern; and
transmit an end notification with the unique pattern identifier from the first proxy to the pattern coordinator in response to detecting that processing by the at least one additional service has ended.

16. The non-transitory computer-readable medium of claim 15 wherein the end notification comprises a completion-notification message.

17. The non-transitory computer-readable medium of claim 15 wherein the end notification comprises a compensation-only notification and wherein program code that is executable by the processing device further causes the processing device to:
   detect an error at at least one of the first service or the at least one additional service; and
   transmit, the compensation-only notification to the pattern coordinator so that the pattern coordinator declines any new enlistments for the pattern.

18. The non-transitory computer-readable medium of claim 15 wherein the unique pattern identifier includes a time stamp indicating when the unique pattern identifier was created and a service identifier corresponding to the first service.

19. The non-transitory computer-readable medium of claim 15 wherein program code that is executable by the processing device further causes the processing device to receive a compensate message from the pattern coordinator to cause a data store associated with at least one of the first service or the at least one additional service to be updated in accordance with a current state of the pattern.

20. The non-transitory computer-readable medium of claim 15 wherein program code that is executable by the processing device further causes the processing device to receive operating rules from a control plane.

* * * * *